May 20, 1958 M. C. YEASTING 2,835,347
TERMINAL ZONE DISPATCHING
Filed Feb. 4, 1957 5 Sheets-Sheet 1
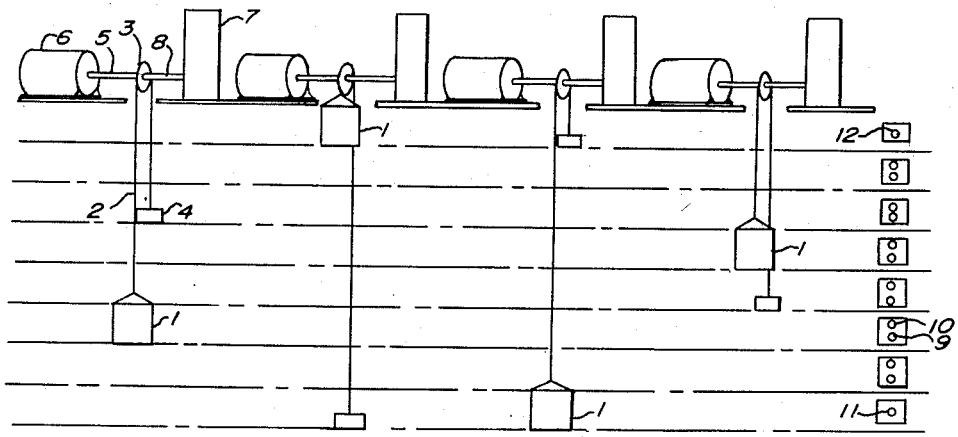
Fig. I
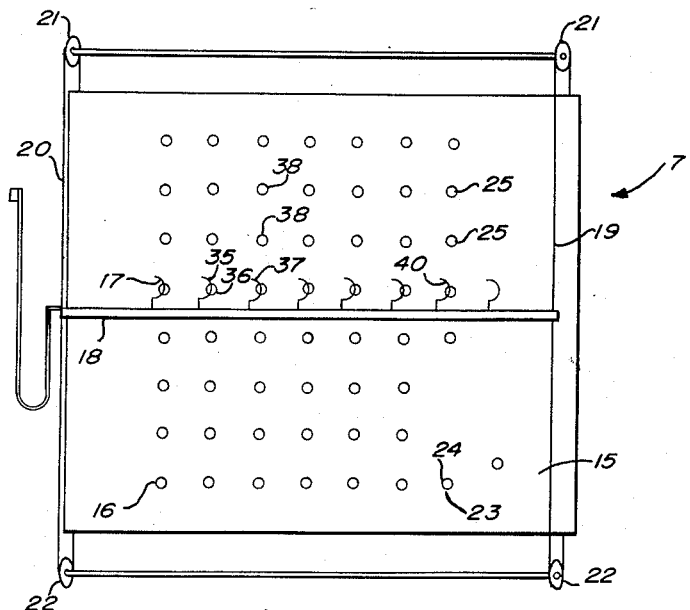
Fig. II
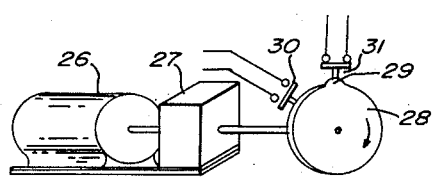
Fig. III
INVENTOR.
MAYNARD C. YEASTING
BY
Marshall, Marshall and Yeasting
ATTORNEYS

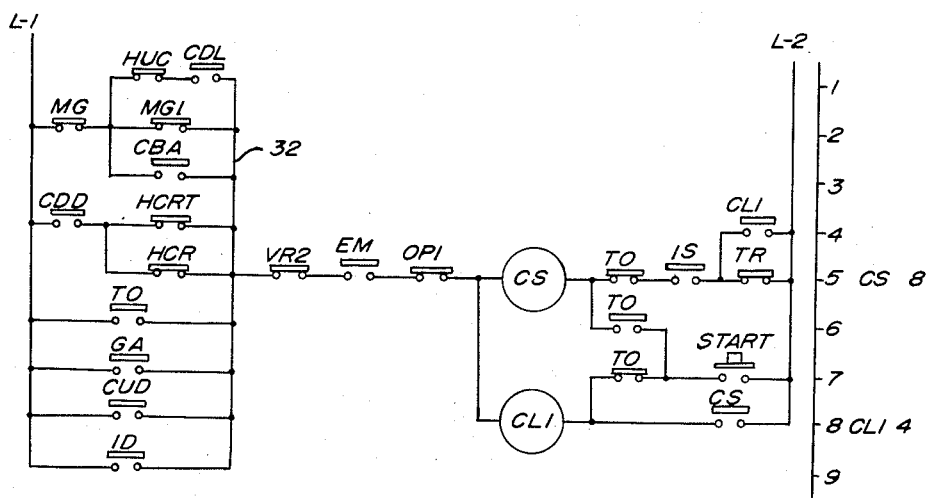
Fig. IV
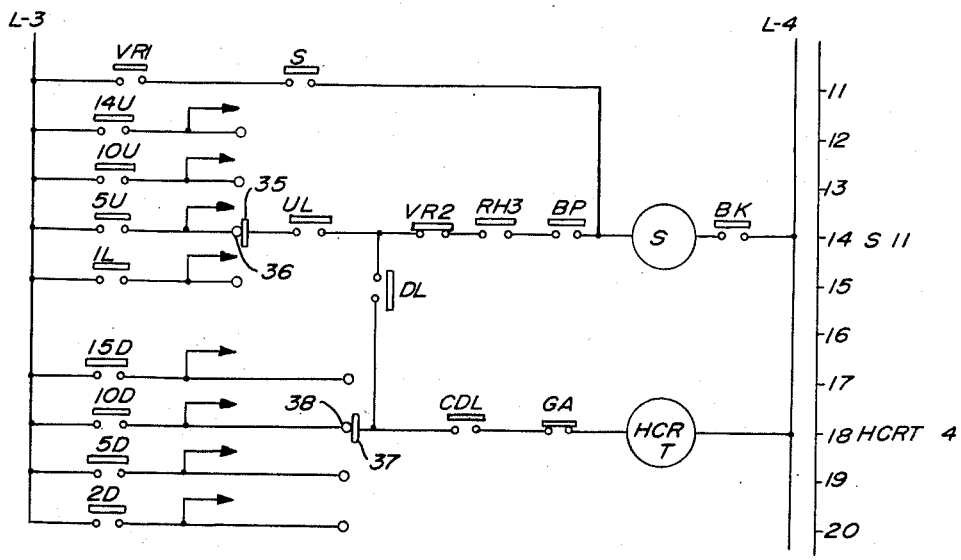
Fig. V

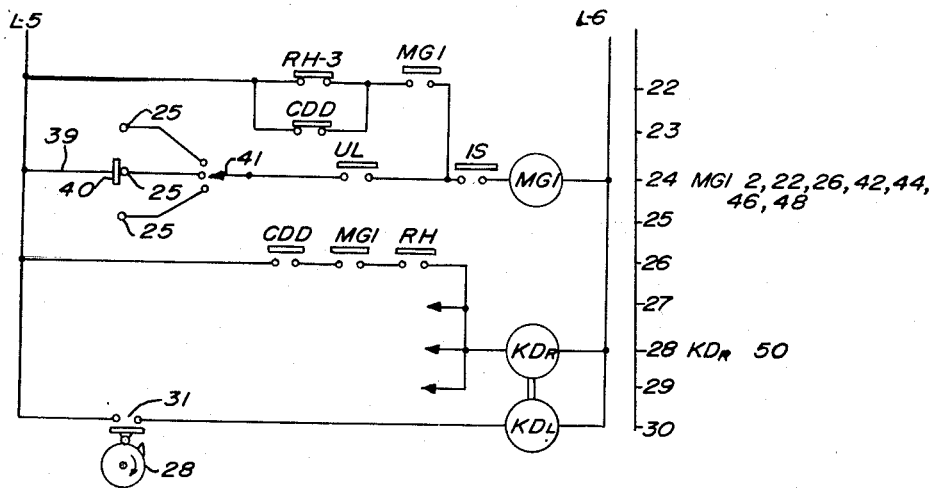
Fig. VI
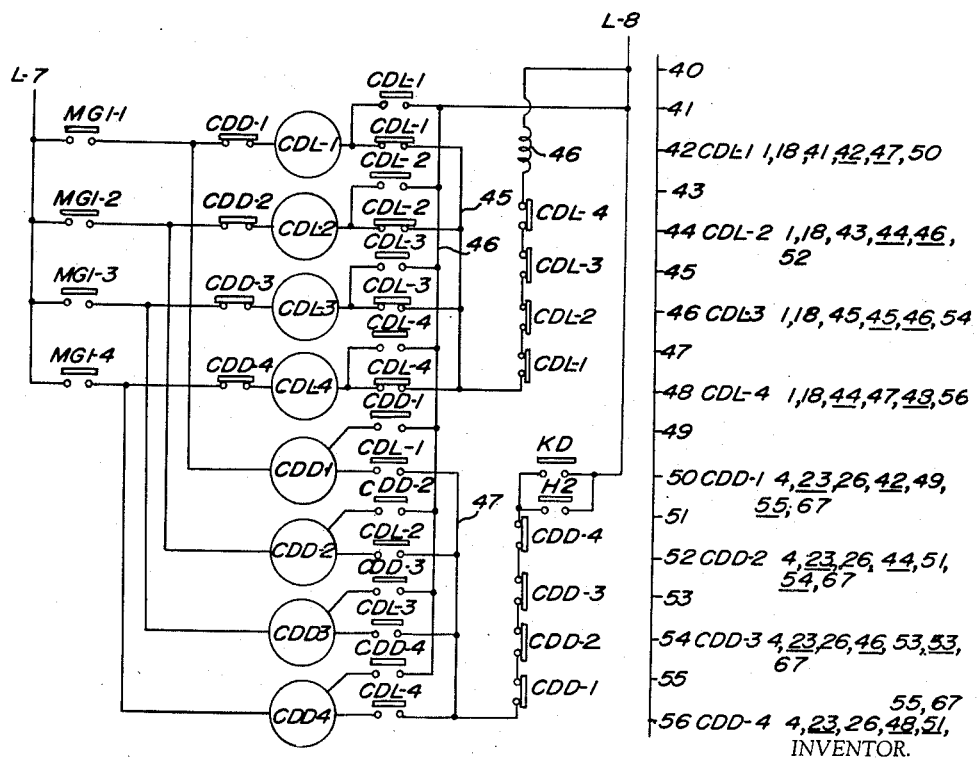
Fig. VII
INVENTOR.
MAYNARD C. YEASTING

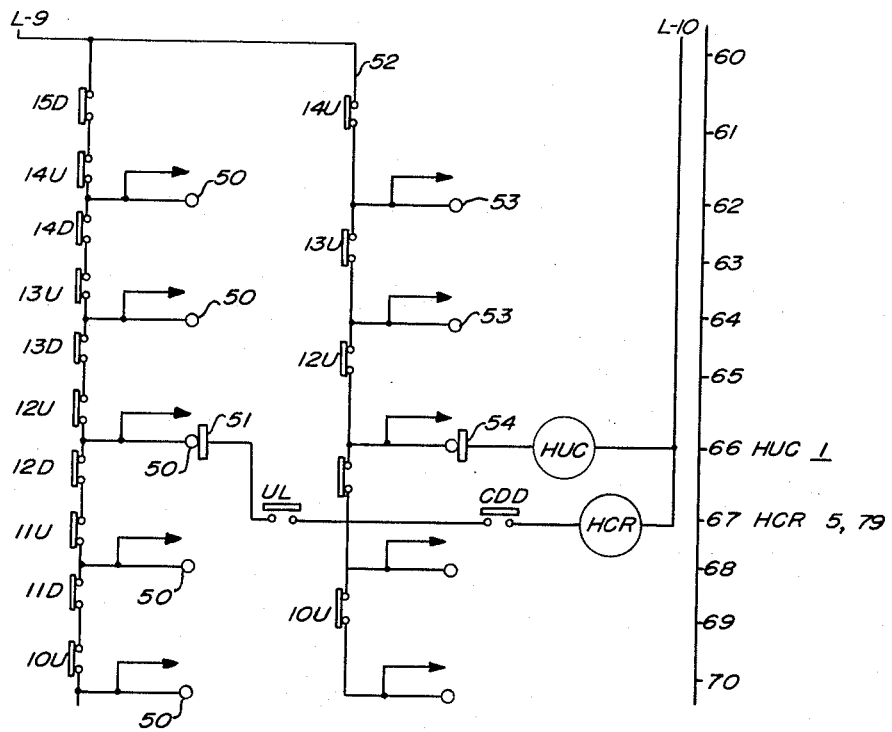
Fig. VIII
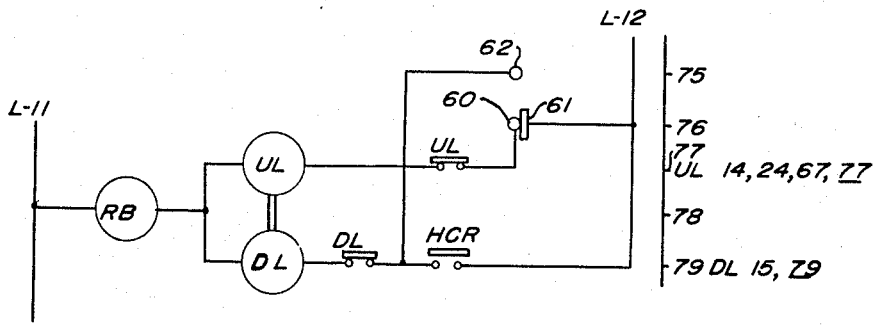
Fig. IX
INVENTOR.
MAYNARD C. YEASTING
BY
Marshall, Marshall & Yeasting
ATTORNEYS May 20, 1958     M. C. YEASTING     2,835,347
TERMINAL ZONE DISPATCHING
Filed Feb. 4, 1957                               5 Sheets-Sheet 5
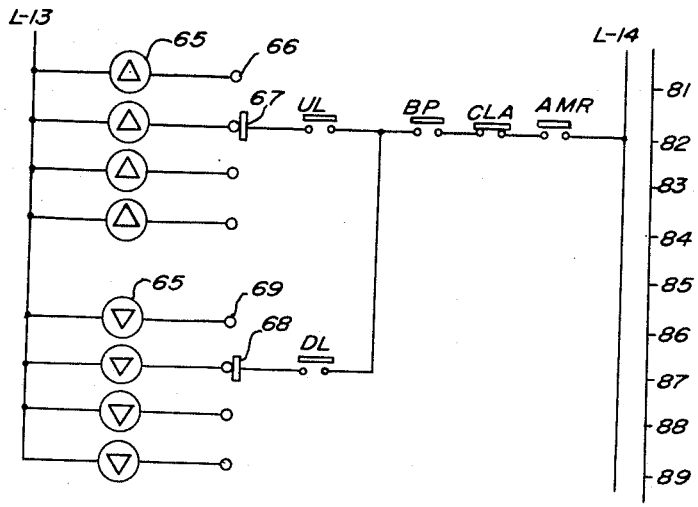
Fig. X
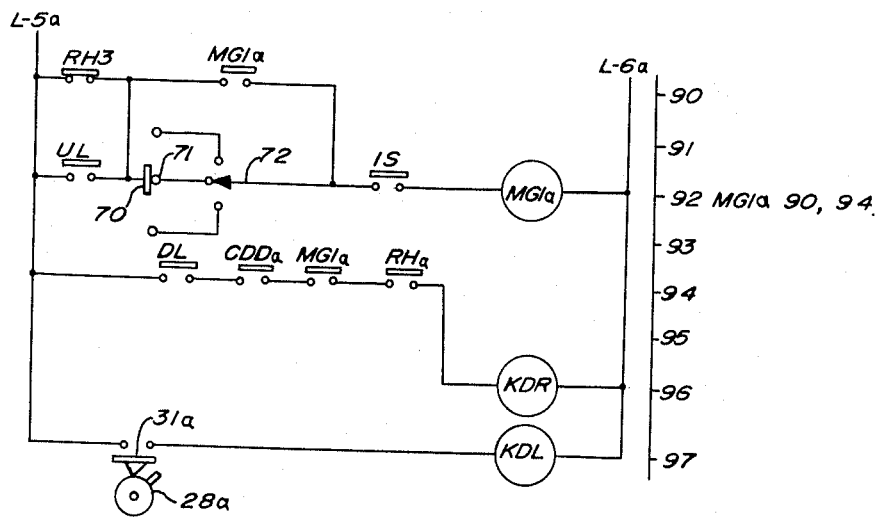
Fig. XI
INVENTOR.
MAYNARD C. YEASTING
BY
*Marshall, Marshall & Yeasting*
ATTORNEYS United States Patent Office 2,835,347
Patented May 20, 1958

2,835,347

TERMINAL ZONE DISPATCHING

Maynard C. Yeasting, Elmore, Ohio, assignor to Toledo Scale Corporation, a corporation of Ohio Application February 4, 1957, Serial No. 637,996

14 Claims. (Cl. 187—29)

This invention relates to elevator controls and in particular to an improved dispatching system that minimizes the travel of the elevator car.

Elevator systems that employ dispatching to keep the cars properly spaced in time as they answer calls for service usually require that the cars travel to the terminal floors before reversing. Dispatching takes place at these terminal floors and the cars are not permitted to leave except according to a time schedule determined by the dispatching machine. Many of the cars operating in such a system travel to the upper terminal floor and part way down again without receiving or discharging any passengers. Thus, this portion of the travel and at least one stop is wasted.

The principal object of this invention is to provide an elevator dispatching system that minimizes the number of car stops to be made during a round trip of the elevator car.

Another object of the invention is to minimize the travel by eliminating any travel of the elevator cars beyond the furtherest call for service.

Another object of the invention is to minimize the number of stops made by an elevator car by dispatching the car from the highest call that it serves rather than the highest floor of the building.

An ancillary object of the invention is to provide timing means so that a car that is to be reversed and dispatched from a floor at which a signal is registered will indicate such action long enough prior to closing the doors to allow prospective passengers to note the change in directional signals and to enter the car.

More specific objects and advantages are apparent from the following description of a preferred form of the invention.

According to the invention a dispatching control system is provided in which each car having served its fartherest car call in a first direction does not respond to farther landing calls in the first direction until it is selected as the next car to be dispatched in the second direction and does not respond to farther landing calls for the second direction until it receives its dispatch signal. In the usual installation the first direction is up, except when applied to basement service. For the upper zone of floors the car stands at the highest floor reached in answering up calls until the dispatch interval expires and the car receives its dispatch signal. At this time the car responds to any down calls above it by traveling up to answer those calls or in the event that there are no down calls at the landing at which the car has been located or above it, it immediately reverses and proceeds in the down direction. In the event a down call is registered at the floor at which the car is standing it first displays a down travel indication and then waits a few seconds before closing its doors and starting down. The cars are selected for dispatching as they pass a predetermined point in their upward travel. In the event there are more than two cars above that point, at the time a third car enters, a selection is made between the last two cars to enter the zone according to any well known selection systems such as giving the selection preference to the lower numbered cars in the system.

A preferred form of the invention is illustrated in the accompanying drawings.

In the drawings:

Fig. I is a schematic diagram illustrating a plurality of elevators arranged to serve a plurality of floors.

Fig. II is a simplified representation of the panel board of a floor selector machine employed with each of the elevators.

Fig. III is a simplified illustration of a dispatching machine arranged to give dispatching signals according to time.

Fig. IV is a circuit diagram illustrating the circuits that control the starting of a car.

Fig. V is a fragmentary schematic diagram illustrating the landing call stopping circuit whereby each car as it approaches a landing call receives a stopping signal.

Fig. VI is a schematic diagram of the dispatching control relays that energize the car selection and dispatching circuits.

Fig. VII is a schematic diagram of the upper terminal zone car selection and dispatching circuits.

Fig. VIII is a schematic diagram of the circuits employed to signal the presence of calls above the location of the car.

Fig. IX is a simplified schematic drawing illustrating the circuits used for reversing the directional preference relays of the elevator car according to its position in the hatchway or the absence of higher calls for service.

Fig. X is a simplified schematic diagram illustrating the landing lantern circuits for indicating the arrival of cars at a landing and their direction of travel when leaving the landing.

Fig. XI is a circuit similar to Fig. VI illustrating an alternative method of operation.

The improved control system may be used with a plurality of elevators such as is illustrated in Fig. I. Such a system of elevators may comprise a series of cars 1 each supported by a cable 2 that passes over a drive sheave 3 and is connected to a counterweight 4. Since the car systems are similar the reference numerals and description are applied to one only. The drive sheave 3 is carried on a motor shaft 5 that is driven by a variable speed motor 6. The controls for the motor include a floor selector machine 7 that is driven by an extension 8 of the armature shaft 5 so as to operate in accordance with the position of the car 1 in the hatchway as it serves a plurality of floors.

Each of the intermediate floors is provided with a pair of push buttons 9 and 10 for registering down and up landing calls respectively. The lower terminal has a single up call button 11 while the top floor has a single down call button 12.

The panel of the floor selector machine 7 is shown in greater detail in Fig. II and comprises a panel board 15 having a rank of contacts 16 for each floor served by the elevator and a file of contacts cooperating with a brush 17 for each control circuit that must be switched as the car travels up and down the hatchway. The brushes 17 are carried on a carriage 18 which in turn is supported by chains 19 and 20 trained over sprockets 21 at the upper edge of the panel board and sprockets 22 at the lower edge. One set of sprockets is driven by the gearing connected to the drive motor shaft extension 8. One file or lane of contacts 23 is of particular interest in connection with this invention since it controls the dispatcher control relays that operate the car selection and dispatching circuits when the car is at the lower terminal with its brush in contact with a contact 24 corresponding to the main floor and when it is in the upper zone of floors with the brush contacting any of a series of contacts 25.

The system operating according to the invention employs timed dispatching with the timed signals being provided by a dispatcher motor 26 that drives through a gear reduction 27 to turn a cam 28 that has a high spot 29 adapted to operate switches 30 and 31 in sequence. The switch 30 is ordinarily employed in connection with detenting circuits for stopping the dispatcher motor 26 whenever switch 30 closes without a car being available for dispatching or in the event that there are no calls for service. The switch 31 is employed in the actual dispatching circuits to give a dispatching signal to the car that has been selected for dispatching.

The control circuits employ a number of relays some of which are shown complete with energizing coils and some with contacts only. These circuits are shown in straight line diagrams in which the lines are numbered. A code at the right of the diagrams lists opposite each relay coil symbol the diagram line numbers in which contacts operated by the coil are shown. An underscored line number indicates back contacts, i. e. closed when the coil is deenergized. The relays are individual to each car except the dispatch latch relay KD. There relays are:

BK—Brake relay, energized when the brake is released
BP—By-pass relay, energized when car is not by-passing signals
CBA—Car call above, energized if there is a car call registered for a floor above the car
CDD—Down dispatch relay, energized to give dispatch signal
CDL—Down selection relay, energized when car is selected for dispatching
CL1—Door closing relay
CS—Car starting relay
CUD—Up dispatch relay
DL—Down direction preference relay, energized to condition car for down travel
EM—Emergency relay, energized when safety circuits indicate condition for safe operation
GA—Gate relay, energized when car doors are closed
$H_2$—Traffic program relay, energized for balanced traffic conditions
HCR—High call reverse relay, energized when there are no landing calls above the car and the car has received its down dispatch signal
HCRT—High call reverse timing relay, energized when the car is selected for dispatching and there is a down call at the floor at which the car is standing. Flux decay timing to delay start after reversing
HUC—Higher up landing call relay, energized when there are no up landing calls above the car
ID—Instant dispatch relay
IS—In service relay, energized when the car has its motor generator set running and is available for service
KD—Dispatcher latch relay (common to all cars) is latched in by signal from dispatcher and released by departure of selected car
MG—Main floor selection and dispatch relay, energized when the car is at the floor
MG1—Auxiliary floor selection and dispatch relay, energized when the car reaches or passes a predetermined point in its travel
OP1—Door opening relay
RH ⎫ Rheostat relays in speed control of elevator motor
RH3 ⎬ RH operates ahead of RH3 during acceleration of
    ⎭ the car
S—Stopping relay, energized from landing calls to stop the car
TO—Throwover from attendant control to automatic, shown in automatic condition
TR—Timing relay, to delay immediate reclosure of the doors after a stop
UL—Up direction preference relay energized to condition car for up travel
VR1 ⎫ Stopping relays, energized during deceleration of
VR2 ⎭ the car
2D—15D ⎫ Landing signal relays
1U—14U ⎭

*Figure IV*

The circuits that control the starting of the car particularly under automatic operation are illustrated in Fig. IV. Two relays are shown, namely, car start relay CS in line 5 and door close relay CL1 in line 8. Two relays are employed at this point in the circuit to take care of the differing requirements whether the elevator is operated with an attendant or an automatic operation. A throwover switch TO having normally closed contacts shown in lines 5 and 7 and normally open contacts in line 6 provide the change-over from one type of operation to the other. The switch contacts are shown in the passenger operated or automatic condition. The car starting circuit with the car standing at an intermediate floor is completed from the line L1 through normally closed MG and MG1 contacts shown in line 2, thence through lead 32 and normally closed contacts VR2, OP1 and now closed emergency contacts EM shown in line 5 to an operating coil of the car start relay CS and thence through now closed throw-over contacts TO, in-service relay contacts IS, and timing relay contacts TR to lead L2. The contacts MG and MG1 are on dispatcher floor relays for the lower and upper terminals respectively, and are open when the car stands at the corresponding terminal or dispatching floor. The contacts are closed at intermediate floors. The contacts VR2, shown in line 5, are part of the stopping circuit and are opened momentarily during the stopping operation. Contacts EM are part of the emergency or safety control circuit and are closed as long as the system is in condition for safe operation. Contacts OP1 are part of the door opening circuit and are open to break the circuit as long as the doors are opening. As soon as the doors have reached fully open position these contacts again close. Contacts IS of an in-service relay are closed as long as the car is conditioned to answer calls for service. Finally, contacts TR are controlled by a timing relay that times the stop and are opened as the door reaches its fully open position and then after a two or three second delay, or up to five seconds depending upon the setting for the system, these contacts close to permit the circuit to be completed. Energization of the car start relay CS causes it to close its contacts in line 8 to establish a circuit for energizing the door closing relay CL1 which in turn closes its contacts in line 4 to provide a by-pass circuit around the timing relay contacts TR and thus hold the car start relay energized when the timing relay TR is again energized by the starting of the car. It was mentioned that the timing relay started timing from the time the doors reached fully open position. To accomplish this the circuit is arranged so that this timing relay, which is of the flux decay type, is energized as long as the car is in motion between floors or the doors are opening.

When the system is on attendant operation contacts TO shown at the left in line 6 are closed so that the circuit to the car starting relay CS may be completed by operation of start button in line 7. At the same time, on attendant operation, contacts TO in lines 5 and 7 are opened so that the automatic starting by timing out of the timing relay TR does not affect the car starting circuit. When the operator pushes the start button in line 7, car start relay CS is energized and is held energized as long as the start button is held closed. When this car start relay is energized it closes or energizes the door close relay and it in turn initiates the door closing operation. As soon as that operation is completed auxiliary circuits, not shown, complete the car starting and running circuits so that the car start button may be released.

On automatic operation the car is started by any of a number of circuits having contacts shown in the left hand portion of the diagram in lines 1 to 9. In the program of operation, according to the invention, an up traveling car is selected for dispatching in a down direction as it passes a certain point below the upper terminal and usually about half the way up the building, or at the base of a tower in building if the elevator serves such tower, and then without stopping except for car calls or up landing calls below its highest car call continues on to the highest car call registered in the car. As soon as it becomes the selected car for dispatching it starts in response to up hall calls above its highest car call. It does not respond to or reverse in response to the highest down call, however, until the dispatching interval expires and it has received its dispatch signal. At this time it answers the highest down call registered and proceeds downwardly. Such highest down call may be above or below the position of the car when it answers its highest up call. Therefore, it is desirable that the car starting circuit shall be completed only in the event that there is a car call requiring travel above the then stopped position of the car, or there is an up hall call and the car has been selected for dispatching, or the dispatching interval had expired and there is a call for service. The car should also start, when on automatic operation, in response to an up dispatching signal when it is standing at the lower terminal or in response to an instant dispatch signal which may be given by a manually operated relay or if it has made an emergency stop between floors a starting circuit may be completed through a gate relay having contacts shown in line 7 as soon as conditions again permit operation.

These various operating conditions are obtained in the circuit shown since the upper terminal zone dispatch relay MG1 is energized as the car reaches a preselected point on its upper travel. This relay remains energized to operate the car selection and dispatching circuits until the car responds to its down dispatch signal. Thus, contacts MG1 in line 2 are opened as the car passes the given point in its upward travel. Since there is no instant dispatch signal then registered contacts ID in line 9 are open, since there is no up dispatching signal remaining for the car at this time, contacts CUD in line 8 are open. Likewise for the gate contacts in line 7 which are open as long as the car doors are open and the throwover contacts in line 6. Similarly, until the down dispatch signal is given, contacts CDD in line 4 are open. Therefore, the only possibility of starting the car after it has passed the preselected point is by closure of the contacts CBA of the car call above relay shown in line 3 so as to complete a circuit around the top terminal zone relay MG1 or by simultaneous closure of contacts of the high up call relay HUC shown in line 1 and the down selection relay CDL also shown in line 1. Thus the car starts from stops above the preselected point if it has a car call for a higher floor so as to close contacts CBA, or if there is a higher up call so as to close contacts HUC in line 1 and the car is selected as indicated by closure of the car down loading selection relay contacts CDL. Thus, the selected car immediately answers calls for service requiring travel in the up direction but it does not respond to down landing calls.

As soon as the dispatching time interval expires the dispatching relay for the dispatched car is energized and it, by closing its contacts CDD in line 4 prepares a circuit to contacts of a high call reverse relay HCR and contacts of a high call reverse timer relay HCRT shown in lines 5 and 4, respectively. Both the high call reverse timer contacts and the high call reverse relay contacts are open in the event the highest down call exists at the floor at which the car is then standing and these contacts are provided to prevent the car from starting to close its doors immediately upon flashing a down direction lantern signal. Thus upon reversing after standing at a floor the down lantern is first lighted and then after the expiration of the timing interval of the high call reverse timer the car starting circuit is completed so that the car may close its doors and leave the floor. In the event there is a down call registered from a floor above the car the high call reverse relay HCR is not energized so that its contacts in line 5 remain closed and the car immediately starts in the up direction to answer the call. If there are neither calls above the car nor at the floor at which the car is standing the high call reverse relay is energized and the high call reverse timer is not energized so that immediately upon reversal of the direction control relays the starting circuit is completed through the down dispatch relay contacts in line 4 and the high call reverse timer contacts HCRT so that the car starts down immediately.

*Figure V*

Fig. V illustrates the circuits that are employed to initiate a car stopping operation in response to a landing call. In this figure only representative landing signal contacts are illustrated, these including up landing relay contacts for the fourteenth, tenth, fifth and first floor and down landing relay contacts for the fifteenth, tenth, fifth and second floor. Intervening floors are provided with similar relays and contacts for registering landing signals. A stopping operation of the car control mechanism is initiated by energization of a stopping relay S shown in line 14. If an up call is registered from the fifth floor, for example, contacts 5U in line 14 are closed so that when a brush 35 of the selector machine engages a fifth floor contact 36 a circuit is completed from the line L3 through the floor relay contacts 5U, the floor selector machine contact 36 and brush 35, up directional preference relay contacts UL, motor control contacts VR2 and RH3 and bypass contacts BP, the stopping relay coil S, and brake control relay contacts BK to the return lead L4. The relay S thereupon closes its contacts as in line 11 to complete a sealing circuit through contacts VR1 and its own contacts, the contacts VR1 being part of the motor stopping relay system and arranged to be closed only during the stopping operation. As soon as the car stops and the brake is set the contacts BK open to deenergize the stopping relay S.

If the car is traveling in the down direction the same sequence of operations happens as a brush 37 engages an energized down contact 38 since the down direction preference relay contacts DL shown in line 15 are then closed instead of the up directional contacts UL.

In the event that a car after having answered its highest call requiring up travel is standing at a floor and a down call is registered at that particular floor the car does not immediately respond to it but the circuit is completed from the down brush 37 through contacts CDL of a down car selection relay CDL and normally closed contacts GA of a gate relay GA to the coil of the high call reverse timer relay HCRT shown in line 18. Thus this relay, of the flux decay variety, is energized as long as the car is standing at a floor with its doors open, is selected for down dispatching, and there is a down call registered at that floor.

*Figure VI*

Fig. VI illustrates the circuits for controlling the operation of the top terminal zone car selection and dispatching relay MG1. As illustrated in Fig. VI the top terminal zone dispatching control relay MG1 is arranged to be energized as soon as the car reaches a preselected position in its upward travel. This relay is energized by way of a circuit in line 24 from lead L5 through branch lead 39, brush 40 of the floor selector machine, one of the contacts 25 in the lane 23 selected by a selector switch 41, up directional preference relay contacts UL, in-service relay contacts IS, the operating coil of the relay MG1, and return lead L6. The relay MG1 is energized as the car passes the selected point which may be at or between floors whether or not it makes a stop at that point. The brush 40 may be displaced from alignment with the other brushes of the carriage if the contact is to be made when the car is between the floors. As soon as the relay MG1 operates it closes its contacts MG1 in line 22 to complete a holding circuit from the line L5 through the parallel combination of motor rheostat contacts RH3 and down dispatching relay contacts CDD, shown in lines 22 and 23 respectively. Thus, this relay is energized as soon as the car passes the selected point on its upward travel and remains energized until both the rheostat relay RH3 and the down dispatching relay CDD are simultaneously energized or until the car is removed from dispatcher control as by deenergizing supply leads L-5 and L-6 or deenergizing the in-service relay IS. This deenergization by operation of the rheostat and dispatching relays occurs when the car responds or moves the first time after receiving a dispatch signal.

The down dispatch signals are issued at substantially equal increments of time by closure of contacts 31 of the dispatching machine shown in Fig. III and in line 30 of Fig. VI to energize a latching coil KDL of a dispatching latch relay KD shown in lines 28 and 30. Closure of the contacts operated by the latching coil KD completes a circuit for the down dispatch relay CDD of the selected car according to circuits shown in Fig. VII. One latch relay KD serves for the upper dispatching floor regardless of the number of cars while a dispatching relay CDD is provided for each of the cars. The dispatching latch relay KD must be reset when a car responds to a dispatching signal and this is done for each car through a circuit shown in line 26 which includes contacts of the down dispatching relay CDD, contacts of the terminal zone dispatching control relay MG1, and contacts RH of a rheostat relay forming part of the motor control circuit. The rheostat relay RH operates in advance of the rheostat relay RH3 when the car starts from a stop. Thus on the first start of a selected car following the receipt of a dispatch signal the dispatching latch relay KD is reset by current flow through this circuit. As the car continues to accelerate and the rheostat relay RH3 operates, it opens the holding circuit to the terminal zone dispatching control relay MG1. The circuit shown in lines 22 to 26 is repeated for each of the other cars while the latch relay KD and dispatcher contacts 31 serve all the cars.

*Figure VII*

The circuits for controlling the selection of the cars and the transmission of dispatch signals to a selected car are illustrated in Fig. VII. These circuits include a down loading relay CDL for each car, as shown in lines 42 to 48 inclusive, and a down dispatch relay CDD for each car, shown in lines 50 to 56 inclusive. These relays are energized for selection and dispatch purposes through contacts of the terminal zone dispatching control relays MG1, the contacts being shown in lines 42, 44, 46, and 48 adjacent a supply lead L7. It will be recalled that each dispatching control relay MG1 is energized as soon as the corresponding car passes the selected point on its upward travel. The closure of the MG1 contacts prepares a circuit from the lead L7 to the coil of the respective loading relay CDL and thence through normally closed contact of that relay to a lead 45 that when all the relays are deenergized is completed through normally closed contacts of all of the car selection relays and an inductance coil 46 connected to the return lead L8. When one of the selection relays is energized it closes a holding circuit through its own contacts CDL to a lead 46 that is connected directly to the return lead L8. The holding circuit for the selected relay is held closed until the corresponding dispatch relay is energized to break the circuit at the contacts CDD, shown in lines 42 to 48.

The circuit may be further explained by following the sequence of events as a car arrives in the terminal zone, is selected for dispatching, and is dispatched. Assuming that there are no cars in the zone so that all of the dispatching and selecting relays CDD and CDL are deenergized, the arrival of the car (assumed to be the number 2 car) and the closure of its control relay contacts MG1 in line 44 immediately completes the circuit through the second car loading relay CDL-2 in line 44, through its normally closed contacts CDL-2, lead 45, the series of normally closed contacts, and the inductance coil 46 to the return lead L8. The relay CDL-2 thereupon closes its contacts CDL-2 to seal itself into the lead L8 and opens its contacts CDL-2 in line 44 to avoid by-passing the series normally closed contacts and the inductance coil 46. Simultaneously, it closes its contacts CDL-2 in line 52 to prepare a circuit for the second car dispatching relay CDD-2. As soon as the dispatching interval expires and the contacts 31, line 30, are closed to latch the dispatching relay KD, it closes its contacts KD in line 50 thereby completing a circuit from the operating coil of the second car dispatching relay CDD-2 through lead 47, the series of normally closed dispatching relay contacts in lines 55—50, and the now closed dispatcher latch relay contacts KD to the return line L8. The second car dispatching relay CDD-2 thereupon closes its contacts CDD-2 in line 51 to complete a holding circuit and at the same time opens its contacts CDD-2 in the series circuit at line 54 to prevent the operation of any of the other dispatching relays. At the same time, it also opens its contacts CDD-2 in line 44 to deenergize the second car selection or loading relay CDL-2. As soon as the car responds to the dispatching signal generated by operation of the dispatching relay CDD-2 it, through the circuits shown in lines 22 and 23, releases the terminal zone dispatching control relay MG1-2 to deenergize the dispatching relay CDD-2 thus permitting the dispatching of another car on the next operation of the dispatching latch relay KD. As was explained before the latch relay is released when the car responds to a dispatching signal.

In the event there are two or more other cars in the terminal zone with their dispatching control relays MG1 operated when the selection relay CDL of a selected car is released, one of the other selection relays CDL will then be energized depending upon which is the first to close its contacts for completing its holding circuit to the return lead L8 and to open its contacts CDL in the series of contacts. Because of the slow build up of current provided by the inductance coil 46, the leads L7 and L8 being supplied with direct current, and the adjustment of the relays CDL to operate at different current intensities one of the relays CDL will gain on the other so that selection is positively made between the two. Thus, it is normally impossible to energize more than one of the selection relays CDL at once.

During certain traffic conditions it is desirable to dispense with dispatching or to provide for immediate dispatching of the cars without awaiting for the timed signal to be transmitted from the contacts 31 through the dispatcher latch relay KD. This may be done by providing program relays having contacts such as the contact H2 in line 51 that by-pass the dispatcher latch relay contacts KD and thus provide for dispatching a car as soon as it has been selected.

*Figure VIII*

Figure VIII illustrates the circuits used to signal or detect the presence of landing calls above the car. These circuits apply principally to the upper zone of floors and comprise a first series of normally closed contacts of up and down landing call relays 1OU to 15D indicated along the left side of Figure VIII. While both up and down contacts are shown the circuit operates equally well with down contacts only in this portion. This circuit is fed from the lead L9 and energizes floor selector machine contacts 50 corresponding to floors at and above the highest landing call. Thus, if the highest up call were at the twelfth floor the first two of the contacts, lines 62 and 64, would be energized. The current flowing through these contacts passes through a brush 51, up direction preference relay contacts UL, shown in line 67, down dispatch relay contacts CDD and high call reverse relay HCR, shown in line 67, to a return lead L–10.

Each car as soon as it receives a dispatching signal and is still conditioned for up travel is reversed by operation of the high call reverse relay, as shown in Figure IX, as soon as it receives its dispatch signal and there are no calls above. The presence of a call above prevents the operation of the high call reverse relay until the car has answered such a call. It will be recalled from the discussion of Figure IV that the car is conditioned to start automatically as soon as it receives a dispatch signal if the high call reverse relay is not operated which would indicate that there is a call above the location of the car. The starting circuit in such case is through the dispatching relay contacts CDD and the normally closed high call reverse contacts HCR.

The signaling of calls above the car requiring further upward travel of the car, in other words up landing calls above the car, are signaled by a second circuit of series contacts of the up floor relays shown near the center of Figure VIII. This circuit from the lead L9 through lead 52 is arranged to energize selector machine contacts 53 corresponding to floors above the highest up landing call. If there are no such calls the current feeds through the lead 52, the series of normally closed contacts, and floor selector machine brush 54 to energize the high up call relay HUC as shown in line 66. As long as there are up calls this relay is deenergized so that the car selected for dispatching, that is the car having its CDL relay energized, may have its starting circuit closed in line 1 by simultaneous closure of the high up call relay contacts HUC and the selection relay contacts CDL. This circuit in Figure VIII, in combination with the circuits controlled by the relays as shown in Figure IV, causes the car to start in response to up landing calls as long as it is selected for dispatching and to reverse at the highest call only after it has received its dispatching signal. Also in the event that it is not at its highest call when it receives the dispatching signal and the highest call is a down call it will then proceed upwardly upon receipt of a dispatching signal to answer the higher down call and then reverse and travel down.

*Figure IX*

Figure IX is a fragmentary schematic diagram illustrating the circuits for controlling the reversal of a car by operation of its directional latch relay UL—DL. This circuit is energized to condition the directional latch relay UL—DL for up directional preference whenever the car reaches a lower terminal. This is accomplished by current flow through a lead L–11, through a car button reset relay coil RB, the up directional coil of the directional latch relay UL—DL then through normally closed contacts UL, in line 77, floor selector machine contact 60 and brush 61 connected to a return lead L–12. Thus, whenever the car, traveling downwardly, reaches the lower terminal, this circuit is immediately completed to trip the latch relay for up directional preference and it in turn operates through associated circuit controls to condition the car for up travel. When the car is traveling up it may be conditioned for down travel if it reaches the upper terminal where the brush 61 contacts floor selector machine contact 62 or it may be conditioned for down travel by operation of the high call reverse relay HCR which closes its contacts in line 79 to complete the circuit for the down directional coil DL of the latch relay UL—DL. In either case the circuit to the operating coils, either the up or down coil, are broken by the normally closed UL or DL contacts in lines 77 or 79 as soon as the relay has been latched in its new position.

*Figure X*

Figure X shows a circuit for energizing the lantern signals located in the hallways over the entrance to the elevators for indicating the arrival of a car and its direction of departure. Signal lanterns 65 located along the left-hand side of the diagram are energized from a low voltage lead L–13 through floor selector machine contacts 66 and brush 67 through a circuit including up directional preference relay contacts UL, by-pass contacts BP, door close relay contacts CLA, and advance motor or elevator motor control contacts AMR, connected to a return lead L–14. This circuit is thus completed to light the lantern when the car picks up a signal to stop at a floor as indicated by closure of the CLA and AMR contacts and provided the car is not by-passing signals such that its by-pass contacts are open. This signal is maintained until the car starts to close its doors which opens the contacts CLA in preparation for departure. In event the car is traveling down or is conditioned for down travel, the down lanterns shown in lines 86 to 89, inclusive, are energized through selector machine contacts 69, brush 68, and down directional preference relay contacts DL in line 87 to operate these lights as the car stops during its down trip. This circuit is illustrated to show that the directional signals are changed instantly upon change in the condition of the directional preference latch relay UL—DL which may occur under certain conditions of operation before the car is permitted to leave a floor in the opposite direction to that at which it arrived at the floor. This condition arises when the car, in its upward travel, has answered its highest call and there is a down call at that floor. In this circuit, as shown in this figure, the car would indicate an up directional signal until it receives the down dispatch signal at which time the directional preference relay is reversed but the car is held at the floor until the high call reverse timer times out. During this time interval the down directional signal lights are illuminated.

*Figure XI*

Figure XI illustrates a method of control differing slightly from that illustrated in Figure VI. According to the system shown in Figure XI, the car holds its selection in response to arrival in the upper terminal zone of floors until it reverses and starts in the down direction. As in the preceding circuit of Figure VI the terminal zone dispatching relay MG1a is energized from the lead L–5A through up directional preference contacts UL and floor selector machine brush 70, contacts 71 and selector switch 72 so as to be energized when the car reaches the selected point in its upward travel. This relay MG1a immediately seals itself in through contacts $RH_3$ of the rheostat control relay $RH_3$ and its own contacts MG1a shown in line 90. This circuit is completed to hold this relay energized as long as the car is conditioned for up travel and until it starts in the down direction since the $RH_3$ contacts are closed as long as the car is at rest. However, the circuit to the relay is broken as soon as the car operates in the down direction because the directional preference relay contacts UL in line 92 are open at the same time that the rheostat control contacts $RH_3$ open as the car accelerates. The dispatching latch relay KD is reset just before the control relay MG1a is released by the circuit shown in line 94. This circuit includes down directional preference relay contacts DL to prevent resetting this relay as long as the car is conditioned for up travel, dispatch relay contacts CDDa, MG1a contacts, and rheostat control contacts RHa. In this circuit as in the other, the contacts RH operate before contacts $RH_3$ so that the resetting is accomplished before the floor dispatching control relay MG1a is released.

The principal difference between this circuit and the one illustrated in Figure VI is that in the circuit of Figure VI the dispatching control circuits are cleared as far as a particular car is concerned as soon as that car moves in either direction in response to a dispatching signal whereas in the circuit shown in Figure XI the dispatching signals are not cleared until the car starts in the down direction after having received a dispatching signal and having answered its highest down call.

The circuits disclosed in the foregoing figures provide an improved type of operation in that no car makes a stop at a floor except to discharge or accept passengers. It is responsive to dispatching as the ordinary dispatching systems with the exception that the car is dispatched under all conditions from its highest call rather than requiring it to travel to the upper terminal. Thus, an up traveling car, when it reaches the predetermined point in its travel, operates its dispatching control relay MG1 and is, therefore, immediately accepted for car selection and dispatching. In the event there are no previously selected cars in the zone the car operates its selection relay and thereupon is conditioned to answer not only its car calls requiring further up travel but also any up landing calls requiring further travel in the up direction. In the event there was another car selected for dispatching the second car, the last to arrive, answers its highest car call and any up hall landing calls below its highest car call. It then waits at such position until the previous car has been dispatched and it becomes the selected car. It then proceeds to answer any further up landing calls. As soon as the dispatching interval expires and the car receives its dispatching signal, it responds to any down landing calls above its position by traveling immediately to such highest down calls, answering such call, reversing and traveling down and picking up or answering down landing calls on its way down. In the event the highest down landing call is registered at the floor which the car reached in its upward travel its directional preference relay is immediately operated to establish a down preference condition but its starting circuit is interrupted for a few seconds by operation of the high call reverse timer relay to advise and permit the intending passengers to note the change in directional signals and enter the car before it attempts to close its doors and start down. In the event there are no down landing calls above the car or at the floor that it reached in discharging its last passenger on its upward travel it immediately reverses, closes its doors and starts down.

Various modifications may be made in this particular circuit described without departing from the scope of the invention.

Having described the invention, I claim:

1. In an elevator control system, in combination, a car selection circuit arranged to select cars for dispatching, a dispatcher floor relay for each car arranged to operate the car selection circuit, means for energizing the dispatcher floor relay as the car reaches a preselected position during travel in a first direction, means arranged to maintain said relay energized until the car either starts in response to a dispatch signal or is removed from dispatcher control, call responsive control means for limiting the response of the car to calls in the first direction when said floor relay is energized, a fartherest call reverse circuit, dispatching means, and means responsive to the dispatching means arranged to place the fartherest call reverse circuit in effect and permit response of the car to calls in a second direction.

2. In a circuit according to claim 1, means for resetting the dispatching means when the car starts in response to a dispatch signal.

3. In a circuit according to claim 1, means for resetting the dispatching means when the car starts in the second direction.

4. In an elevator control system, in combination, a plurality of elevator cars arranged to serve a plurality of floors, a dispatcher floor relay for each car, means for energizing the floor relay when the car reaches a predetermined position during travel in a first direction, a car selection circuit operated by the dispatcher floor relays, a dispatching mechanism, an automatic car starting circuit for starting the car after each stop at an intermediate floor, contacts on said dispatcher floor relay for interrupting said car starting circuit, means responsive to landing calls requiring further travel in the first direction arranged to complete the car starting circuit of a selected car, a fartherest call reverse circuit, and means responsive to the dispatching mechanism and the fartherest call reverse circuit for starting a selected car toward the fartherest call.

5. In a circuit according to claim 4, means for resetting the dispatcher mechanism when a car moves in response to the dispatching signal.

6. In a circuit according to claim 4, means for signaling the reversal of the car prior to closing the doors when there is a call for service in the second direction at the floor at which the car is standing.

7. In an elevator control system, in combination, a plurality of elevator cars arranged to serve a plurality of floors, a dispatching mechanism, a dispatcher floor relay for each elevator car, an automatic starting circuit for each car arranged to start the car after each stop, means for energizing the dispatcher floor relay when the car reaches a preselected position while traveling in a first direction, said floor relay being arranged to interrupt the automatic starting circuit of the car, first call means responsive to landing calls ahead of the car requiring further travel in the first direction, second call means responsive to landing calls ahead of the car, said first call means being arranged to complete the car starting circuit of a selected car, a dispatching relay for each car, means for selecting cars for dispatching, said dispatching mechanism being adapted to energize the dispatching relay for a selected car, said dispatching relay and said second call means being effective to complete the starting circuits of the car, and means for reversing the car when it reaches its fartherest call after receiving a dispatch signal.

8. In an elevator control system, in combination, a plurality of elevator cars arranged to serve a plurality of floors, an automatic starting circuit for each car for starting it after each stop, a fartherest call circuit arranged to reverse the direction of travel of the car when no farther calls are registered, a car selection circuit for selecting cars for dispatching, a dispatcher floor relay for each car that is energized as the car reaches a predetermined position during travel in a first direction and that serves to interrupt the car starting circuit, means for maintaining the relay energized until the car is dispatched, means responsive to calls requiring further travel in the first direction for maintaining said car starting circuit in operation, a dispatching mechanism, and means responsive to the dispatch mechanism for placing the car under control of its fartherest call circuit for responding to calls in the second direction.

9. In an elevator system, in combination, a plurality of elevator cars serving a plurality of floors, an automatic starting circuit for each car for starting the car after each stop, a dispatching mechanism, a car selection circuit for selecting cars for dispatching, said circuit being arranged to accept cars for selection as they reach a preselected position while traveling in a first direction, a first circuit responsive only to calls ahead of the car requiring further travel in the first direction, a second circuit responsive to calls ahead of the car for reversing the car at the fartherest call, means controlled by the first circuit and the selection circuit for limiting response of cars accepted for selection to calls requiring further travel, and means responsive to the dispatching mechanism and the second circuit for sending the car to the fartherest call and reversing it at such call.

10. In an elevator system according to claim 9, means for resetting the dispatching mechanism when the car responds to a dispatching signal.

11. In an elevator system according to claim 9, means for resetting the dispatching mechanism when the selected car reverses its direction of travel.

12. In an elevator system according to claim 9, means for resetting the dispatching mechanism and selecting mechanism as the car moves away from a floor after having received a dispatch signal.

13. In an elevator system, in combination, a plurality of elevator cars serving a plurality of floors, an automatic starting circuit for each car for starting the car after each stop, a car selection circuit that includes a relay for each car that is energized as the car reaches a preselected position while traveling in a first direction, first signal means for indicating the existence of calls beyond the car requiring further travel in the first direction, second signal means for indicating calls beyond the car requiring travel in a second direction, means limiting the response of the car to signals indicated by the first signal means, dispatching means rendering the car responsive to at least the second signal means, and means for reversing the car when it answers its fartherest call in the first direction.

14. In an elevator control circuit for a plurality of elevators, in combination, an automatic starting circuit for each car for starting the car after each stop, a fartherest call reversing circuit for each car for reversing the car when there are no registered calls beyond the car in a first direction, a dispatching mechanism, a car selection circuit for accepting cars for dispatching as they reach a predetermined position during their travel in a first direction and selecting from the accepted cars the one next to be dispatched, means limiting starting of accepted cars to car calls only, means limiting starting of selected cars to landing calls requiring further travel in the first direction, and means responsive to the dispatching mechanism for permitting response to any calls.

No references cited.